United States Patent [19]

Hunsbedt et al.

[11] Patent Number: 5,190,720

[45] Date of Patent: Mar. 2, 1993

[54] LIQUID METAL COOLED NUCLEAR REACTOR PLANT SYSTEM

[75] Inventors: Anstein Hunsbedt, Los Gatos; Charles E. Boardman, Saratoga, both of Calif.

[73] Assignee: General Electric Company, San Jose, Calif.

[21] Appl. No.: 745,809

[22] Filed: Aug. 16, 1991

[51] Int. Cl.5 .............................................. G21C 11/08
[52] U.S. Cl. ..................................... 376/287; 376/299; 376/290
[58] Field of Search ............... 376/287, 290, 293, 294, 376/295, 296, 289, 299

[56] References Cited

U.S. PATENT DOCUMENTS

| | | | |
|---|---|---|---|
| 4,508,677 | 4/1985 | Craig et al. | 376/174 |
| 4,678,626 | 7/1987 | Germer | 376/298 |
| 4,959,193 | 8/1990 | Hunsbedt et al. | 376/299 |
| 5,021,211 | 6/1991 | Hunsbedt et al. | 376/299 |
| 5,043,136 | 8/1991 | Hunsbedt et al. | 376/299 |

Primary Examiner—Donald P. Walsh
Assistant Examiner—Frederick H. Voss
Attorney, Agent, or Firm—H. C. Burgess

[57] ABSTRACT

A liquid metal cooled nuclear reactor having a passive cooling system for removing residual heat resulting for fuel decay during reactor shutdown, or heat produced during a mishap. The reactor system is enhanced with sealing means for excluding external air from contact with the liquid metal coolant leaking from the reactor vessel during an accident. The invention also includes a silo structure which resists attack by leaking liquid metal coolant, and an added unique cooling means.

19 Claims, 5 Drawing Sheets

LIQUID METAL COOLED NUCLEAR REACTOR PLANT SYSTEM

The Government of the United States has rights in this invention under Contract No. DE-AC0389SF17445.

This application is related to pending applications for patent Ser. No. 07/350,187, filed May 11, 1989, and Ser. No. 07/541,647, filed June 21, 1990.

FIELD OF THE INVENTION

This invention relates to an improvement in liquid metal cooled nuclear reactors plants having a pool of liquid metal coolant with the heat generating fissionable fuel core substantially immersed in the liquid metal pool, such as the type disclosed in U.S. Letters Pat. No. 4,508,677, issued Apr. 2, 1985.

BACKGROUND OF THE INVENTION

In the operation of liquid sodium or sodium-potassium metal cooled nuclear reactors for power generation, it may be necessary to shut down the fission reaction of the fuel to deal with emergencies or carry out routine maintenance services. Reactor shut down is attained by inserting neutron absorbing control rods into the core of fissionable fuel to deprive the fuel of the needed fission producing neutrons. However decay of the fuel in the shut down reactor continues to produce heat in significant amounts which must be dissipated from the reactor unit.

The heat capacity of the liquid metal coolant and adjacent structure aid in dissipating the residual heat. However, the structural materials of the nuclear reactor may not be capable of safely withstanding prolonged high temperatures. For example the concrete of the walls of the typical housing silo may splay and crack when subjected to high temperatures. Accordingly, auxiliary cooling systems are commonly utilized to safely remove heat from the nuclear reactor structure during shut down.

Conventional nuclear reactors have utilized a variety of elaborate energy driven cooling systems to dissipate heat from the reactor. In many of the situations warranting a shutdown, the energy supply to the cooling systems make the cooling systems themselves subject to failure. For example, pumps and ventilation systems to cool the core may fail. Furthermore, if operator intervention is necessary, there are foreseeable scenarios in which the operator would be unable to provide the appropriate action. The most reliable and desirable cooling system would be a completely passive system which could continuously remove the residual heat generated after shutdown regardless of conditions.

Liquid metal cooled reactors such as the modular type disclosed in U.S. Pat. No. 4,508,677, utilizing sodium or sodium-potassium as the coolant provides numerous advantages. Water cooled reactors operate at or near the boiling point of water. Any significant rise in temperature results in the generation of steam and increased pressure. By contrast, sodium or sodium-potassium has an extremely high boiling point, in the range of 1800 degrees Fahrenheit at one atmosphere pressure. The normal operating temperature of the reactor is in the range of about 900 degrees Fahrenheit. Because of the high boiling point of the liquid metal, the pressure problems associated with water cooled reactors and the steam generated thereby are eliminated. The heat capacity of the liquid metal permits the sodium or sodium-potassium to be heated several hundred degrees Fahrenheit without danger of materials failure in the reactor.

The reactor vessels for pool-type liquid-metal cooled reactors are essentially open top cylindrical tanks without any perforations to interrupt the integrity of the vessel walls. Sealing of side and bottom walls is essential to prevent the leakage of liquid metal from the primary vessel. The vessel surfaces must also be accessible for the rigorous inspections required by safety considerations.

In the typical sodium cooled reactor, two levels of heat conveying sodium loops or cooling circuits are used. Usually, a single primary loop and two or more secondary loops are used. The primary heat transferring loop contains very radioactive sodium which is heated by the fuel rods. The primary loop passes through heat exchangers to exchange the heat with one of the non-radioactive secondary sodium loops. In general, sodium cooled reactors ar designed to incorporate redundant secondary heat transferring loops in the event of failure of one loop.

Upon shutdown of the reactor by fully inserting the control rods, residual heat continues to be produced and dissipated according to the heat capacity of the plant. Assuming that the reactor has been at full power for a long period of time, during the first hour following shutdown, an average of about 2% of full power continues to be generated. The residual heat produced continues to decay with time.

Exaggerated conservative safety concerns for dealing with postulated worst possible scenario accident conditions have raised questions as to means for coping with events such as the coincidental failure of both the reactor vessel and the containment or guard vessel, whereupon liquid coolant loss due to the resulting leakage could significantly lower the coolant level within the reactor vessel. Reduced reactor coolant levels can significantly impede or interrupt the normal coolant circulation flow through a coolant loop or circuit, whereby heat is transported away from the fuel core during routine operation. This impediment or termination due to reduced coolant level also applies to designed passive cooling systems employing inherent processes comprising the natural convection of fluids, conduction, radiation and convection, as a means of removing heat through its transfer by such means. Other such improbable extreme events possible affecting coolant levels include a hypothetical core disassembly accident that damages the fuel core and results in expulsion of coolant such as sodium up into the head access area of the reactor structure, or a maintenance accident involving a break in the reactor closure head.

This invention comprises improvements in safety systems for coping with shutdown decay heat from a liquid metal cooled nuclear reactor such as the unit disclosed and claimed in U.S. Letters Pat. No. 4,678,626, issued Dec. 2, 1985.

The disclosed contents of the above noted U.S. Letters Pat. Nos. 4,508,677 and 4,678,626, comprising related background art, are incorporated herein by reference.

SUMMARY OF THE INVENTION

This invention comprises improvements in liquid metal cooled nuclear reactor plant systems comprising passive heat removal safety arrangements which transfers reactor shut down decay and sensible heat from the fuel core and liquid metal coolant by means of the inherent thermal energy transfer mechanisms of conduction, radiation, convection and natural convection of fluids out to the ambient atmosphere. The improvements of this invention include measures which preclude release of radiation contaminants due to the liquid metal coolant attacking and destroying the containment housing, silo vessel and other retaining structures of the nuclear reactor and/or escaping through breaches in the structure. The improved measures of the invention provide added auxiliary passive cooling means in combination with effective means for retaining the liquid metal coolant while precluding its destructive action upon reactor containing structures.

OBJECTS OF THE INVENTION

It is a primary object of this invention to provide improvements in passive cooling safety systems for liquid metal cooled nuclear reactors for the removal of decay and sensible heat under conditions of accidental malfunctions.

It is also an object of this invention to provide measures for enhancing the protection afforded by indirect cooling safety means for the passive cooling of liquid metal cooled nuclear reactors comprising a core of fissionable fuel substantially immersed within a pool of liquid metal coolant.

It is another object of this invention to provide added protective measures for passive cooling safety systems in liquid metal cooled nuclear reactors comprising an auxiliary cooling circuit for removing heat from a reduced level of reactor coolant.

It is a further object of this invention to provide means for improving the operating safety of heat removing systems for liquid metal cooled nuclear reactors which are entirely passive and operate by the inherent phenomenon of natural convection in fluids, conduction, convection and thermal radiation.

It is a still further object of this invention to provide passive safety systems for removing decay and sensible heat produced during shut down or an accidental interruption in a liquid metal cooled nuclear reactors which affords effective protection against the destructive effects of escaping liquid metal coolant and inhibits its escape from the plant components.

DETAILED DESCRIPTION OF THE INVENTION

Figure 1:
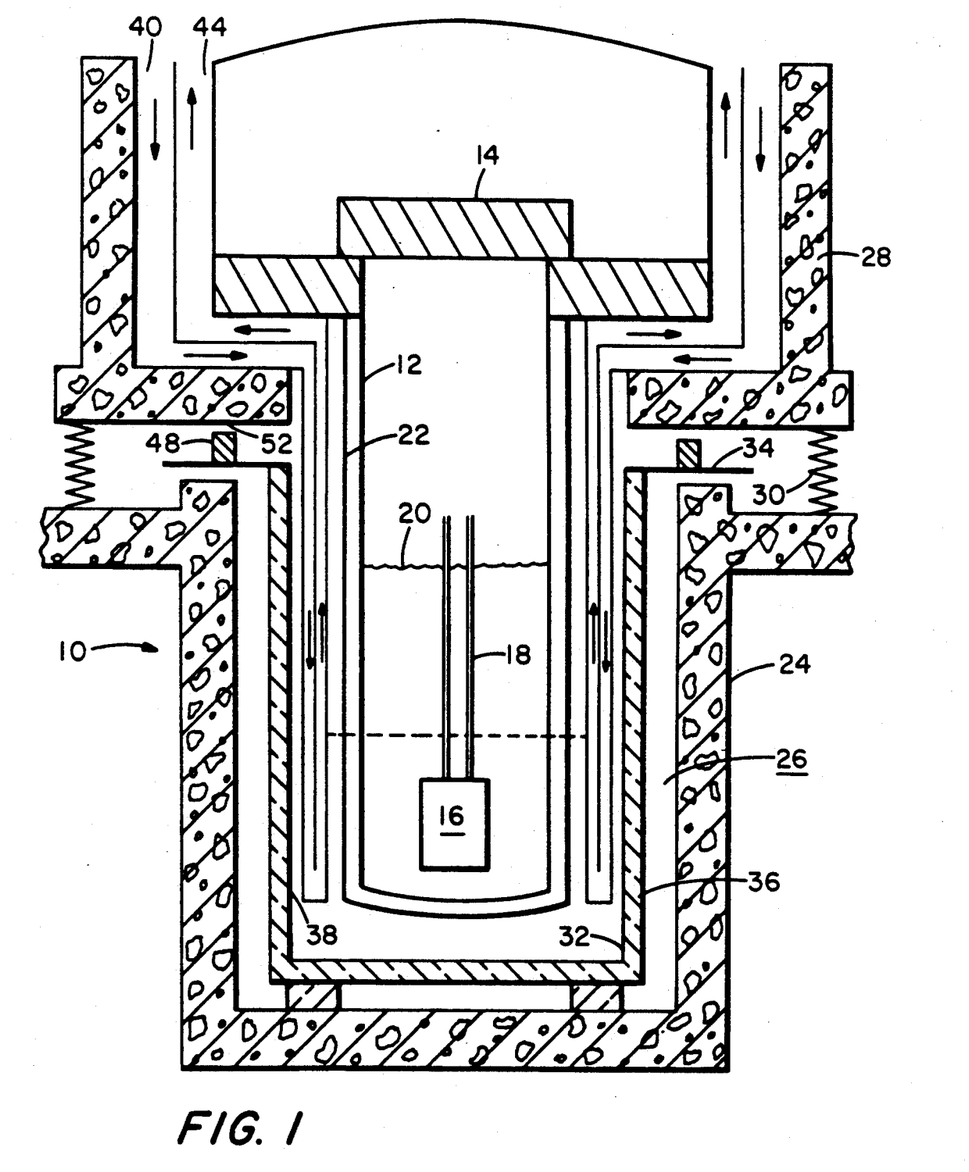
FIG. 1 is a schematic illustration of a liquid metal cooled nuclear reactor plant of this invention shown in cross-section.

Referring to FIG. 1 of the drawing, a current liquid metal cooled nuclear reactor plant design comprises the use of a double walled reactor vessel which is substantially enclosed within an in-ground silo structure. Positioning the liquid metal containing reactor vessel inground facilitates the retention of any liquid metal coolant escaping from an unlikely rupture of the double walls of a concentrically arranged reactor pressure vessel and the surrounding containment vessel.

Additionally, proposed recent designs for such liquid metal cooled nuclear reactor plant include passive cooling systems. Typical systems comprise one or more paired heat exchanger fluid circuits provided in a variety of arrangements which operate by means of the natural phenomenon of the heat induced convection of fluids, conduction, radiation and convection, for removing excessive heat from specific components of the reactor plant. For instance a first fluid flow conduit of the heat exchanger circuit, acting due to natural convection, continuously draws in cool atmospheric air down to an over heated portion of the plant, and a second fluid flow conduit of the heat exchanger circuit continuously passes the resultant heated air up and back out into the atmosphere.

Such a passive cooling system operates through inherent natural phenomenon, and does not require operating personnel or instrumentation to initiate any manual or mechanical action for cooling, or power and mechanical or chemical means to achieve the auxiliary cooling function.

A liquid metal cooled nuclear reactor plant 10 provided with such a passive auxiliary cooling safety system, is shown in part in FIG. 1 of the drawing. The nuclear reactor plant 10 includes a reactor vessel 12 comprising an open top, cylindrical tank positioned with its longitudinal axis extending generally vertical upward and having a removable cover 14 to isolate the vessel's contents and provide for access. The reactor vessel 12 contains a core 16 of heat producing fissionable fuel material provided with a multiplicity of control rods 18 enclosing neutron absorbing material. The control rods 18 are reciprocally movable into and out from the fuel core 16 for regulating the rate of fission of the heat producing fission reaction or shutting down the reaction.

Reactor vessel 12 contains a pool of liquid metal coolant 20 which covers the heat producing fuel core 16 and circulates through one or more coolant loops or circuits to carry heat away from the fuel core, and transport it to a location where it is utilized and dissipated for generating steam or in performing other work. Common liquid metal coolants comprise sodium or potassium metals which are liquid at suitable reactor operating temperature and exhibit high specific heat temperature.

A containment vessel 22, comprising an open top, cylindrical tank positioned with its longitudinal axis generally vertical, is concentrically positioned surrounding the cylindrical reaction vessel 12 in spaced apart relation whereby a closed space is provided between the two juxtaposed walls of the reactor and containment vessels. The space between the reactor and containment vessels is sealed and contains a gas which is not reactive with the liquid metal coolant, such as nitrogen or an inert gas such as argon. This body of gas surrounding the liquid metal containing reactor vessel 12 provides a protective barrier in the event of leakage of coolant from the reactor vessel into this space, and isolates the reactor vessel 12 and its radioactive contents from the surrounding atmosphere. The particular gas composition filling the intermediate space should be one which does not react with a highly reactive liquid metal coolant such as sodium or potassium.

Substantially embedded within the earth is an open top reactor silo vessel 24 having at least a majority of its vertical cylindrical vessel structure below ground level. Thus secured by substantial immersion within the earth, the reactor silo vessel 24 provides a sturdy foundation for the nuclear reactor plant 10 and a silo cavity 26. The reactor silo vessel structure 24 is constructed at least in substantial part of concrete and/or metal. The silo cavity 26 generally comprises a burried, open upper ended cylindrical tank having its longitudinal axis generally vertical.

To cope with earth quakes, recent liquid metal cooled nuclear reactor plants have been designed with the more critical components and/or structures seismically isolated from ground movement. For example, in one design the composite of the reactor vessel 12 and its protective containment vessel 22 is suspended from an overlying superstructure 28 including other seismic sensitive plant components, with the vessel carrying superstructure 28 mounted and supported with seismically isolating means resting on the fixed structure foundation comprising an upper structural portion of the embedded reactor silo vessel 24. Thus the superstructure 28 carrying the reactor and containment vessels can be mounted and supported on shock absorbers 30, such as springs, rubber pads, hydraulic absorbers and the like which are fixed to an upper annular surface or flange extending around the earth embedded silo vessel 24 or silo liner tank 32 comprising the fixed structure.

Silo vessels 24 for liquid metal cooled nuclear reactors are commonly and preferably protected from attack of any leaking liquid metal coolant such as sodium by providing a silo vessel liner tank 32 of a suitable durable metal resistant to any effects of contact with the liquid metal coolant, such as steel. The use of a metal silo liner tank 32 is especially significant with a silo vessel 24 of concrete which is vulnerable to attack by liquid sodium and the like. A metal silo liner tank 32 is preferably provided with an upper edge flange 34 which projects outward over the top surface of a concrete silo vessel 24 to extend its protection to all exposed surfaces.

Additionally it is usually desirable to provide a body of thermal insulation 36 between the silo liner 32 and the concrete silo vessel 24 to preserve the integrity of the silo vessel by shielding it from damaging high temperatures. Spacing these juxtaposed components apart from each other, namely the double walls of the reactor and containment vessels a distance from the silo liner with an outer insulation, and also the silo liner with its insulation a distance from the silo vessel, provides void spaces intermediate said components, such as the space 38 between the wall of the containment vessel 22 and the silo liner tank 32. These void spaces sequentially augments the heat insulating protection of all components outward beyond the reactor vessel.

Space 38, or adjacent spaces between vessels or the like components can be utilized in providing auxiliary cooling for removing decay heat during shutdown or excess heat occurring pursuant to a malfunction. For example, an auxiliary passive cooling system for removing heat from around the reactor vessel provides one or more heat exchanging fluid circuits providing for a flow of external air from atmosphere down within such a space and, upon an increase in the temperature of the air and reduced density due to absorbed heat, a flow upward within such a space whereupon the air with the transferred heat is discharged back out into the atmosphere.

A typical passive auxiliary cooling system for removing heat resulting from fuel decay during reactor shut down, or any excessive heat occurring during a period of malfunction, as noted above, comprises multiple pairs of sealed fluid flow conduits referred to as heat transfer tubes providing an auxiliary heat exchanging circuit. As shown in FIG. 1, a first fluid flow heat exchanger conduit 40 is provided to draw cool atmospheric air down to an over heated area within space 38 whereby heat is transferred to the air. The thus heated air flows upward, impelled by its lower density, through a second fluid flow heat exchanger conduit 44 and out into the atmosphere where the heat energy transported for a lower portion of the reactor plant is dissipated out into the atmosphere. Such an auxiliary passive cooling system, being closed off or sealed with respect to the internal workings or components of the nuclear reactor plant, removes heat therefrom by indirect means whereby it cannot release radioactive contaminants along with heat out into the external atmosphere.

An extreme and improbable postulated event proposed for safety considerations is the unlikely rupturing of both the reactor and containment vessels 12 and 22 and any further barriers between said vessels and the silo 24. Such an event would enable the escape of liquid metal coolant 20 from the reactor vessel out into the silo structure 24 as well as imperiously reducing the level of coolant remaining in the reactor vessel for conveying heat away from the fuel core. Hot liquid metal coolant, such as the commonly employed sodium escaping into a silo composed of concrete containing hydraulic cement could result in exothermic chemical reactions, sodium fires, and heat up of the concrete which could diminish the structural integrity of the load bearing silo 24 wall to the extent where ground water would enter the in-ground reactor cavity and explosively react with the leaked hot sodium. The results of such a debilitating event could not only be a severe radiological release but also a weakening of the reactor foundation or support system with associated unknown consequences.

Leakage of liquid metal coolant resulting from vessel ruptures into the spaces between vessel components can result in the normal cooling heat exchanging circuits and fluid flow therethrough being lost because of a lowering of the sodium level within the reactor vessel. Significant loss of this heat removing function and system would result in heatup of the liquid sodium coolant in the core region due to fuel decay heat and the sodium coolant would start boiling within several hours and the fuel rods would fail and release its fuel into the coolant. Theoretically a radiological release could occur through the vent gap 52 which makes direct communication between the reactor cavity and external atmosphere. Heat is continuously being removed from the sodium contained in the cavity space 38 via the auxiliary heat exchanger circuits thus preventing sodium boiling in this region.

In accordance with one aspect of this invention at least one annular sealing member 48 is positioned between an upper portion for the fixed structure, such as the reactor silo 24 or silo liner 32, and the seismically isolated reactor superstructure 28. This seal 48 provides means for closing off the reactor cavity from the external atmospheric air while accommodating seismically induced movement of different magnitudes between the embedded fixed structure and the seismically isolated superstructure.

The seal member(s) 48 typically is fixed on an upper surface portion of the reactor silo 24 or the silo liner tank 32, extending upward toward a under surface portion of reactor superstructure 28. The seal member 48 is preferably constructed and applied in a manner to accommodate up to about 20 inches of horizontal movement and up to about 0.5 inches of vertical differential movement between the fixed structure 26 and the seismically isolated superstructure 28 during a severe earthquake event. For service in a typical liquid metal cooled nuclear reactor of power generation, the seal member 48 can comprise an annular unit of, for example, approximately 30 feet in diameter, or greater. Also the seal member(s) 48 should be constructed of materials which are resistant to radiation over extended periods.

Figure 2:
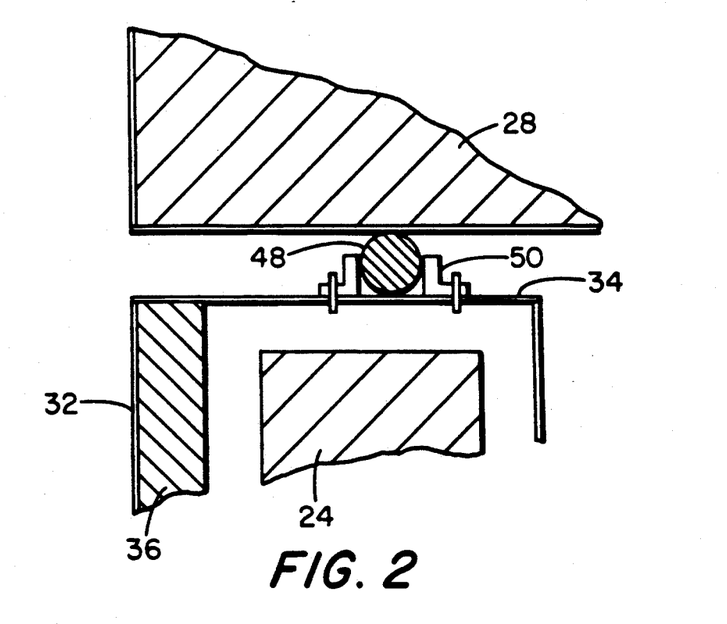
FIG. 2 is an exploded view illustrating a variation in detail of a portion of the structure of the embodiment shown in FIG. 1.
Figure 3:
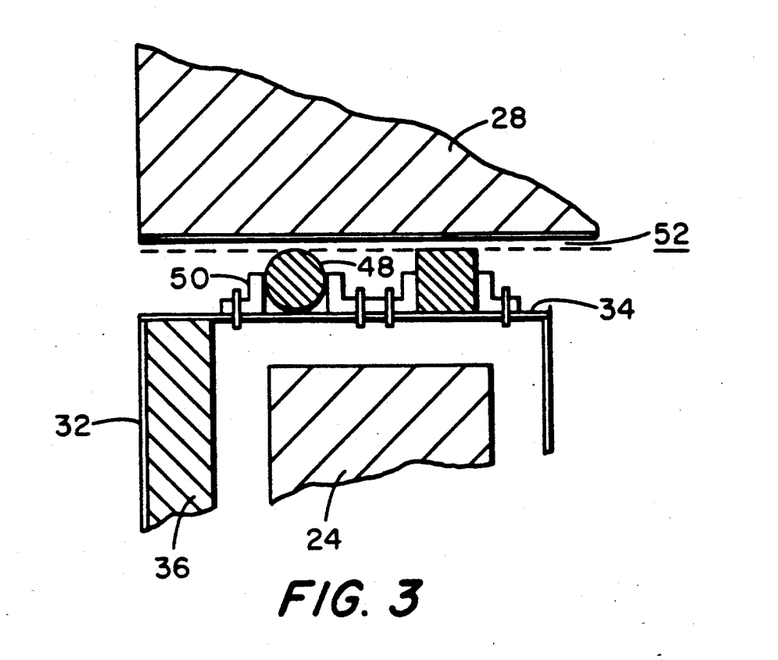
FIG. 3 is also an exploded view illustrating a further variation in detail of a portion of the structure of the embodiment shown in FIG. 1.
Figure 4:
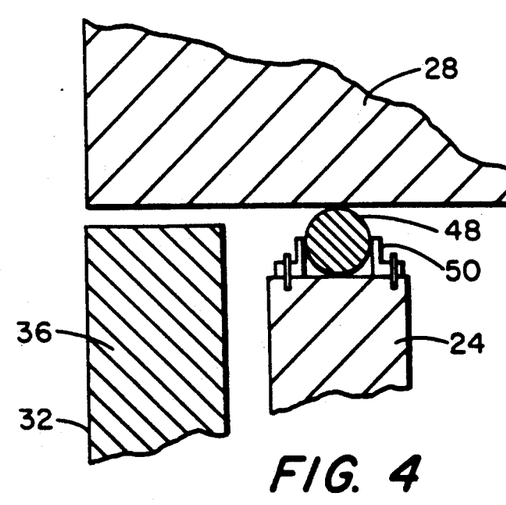
FIG. 4 is an exploded view illustrating another variation in detail of a portion of the structure of the embodiment shown in FIG. 1.
Figure 5:
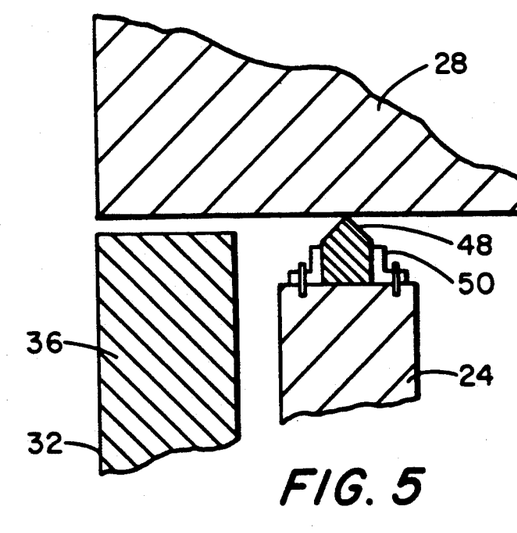
FIG. 5 is an exploded view illustrating still another variation in detail of a portion of the structure of the embodiment shown in FIG. 1.

The seal members 48 of this invention comprise a variety of suitable material including a continuous compressible mass of pliant material such as polysiloxane (a composition marketed by Bisco Products, Inc.) or a continuous annulus of a hollow gas containing tube composed of an elastic polymer or elastomeric material. In this latter case, heat attributable to the reactor malfunction will expand the enclosed gas swelling the tubular seal member to enhance its sealing function. The sealing members 48 can be used singly or in multiples such as two or more parallel or concentric units as shown in FIG. 3. Moreover, as well as the generally round or oval tribular seal illustrated in FIG. 2, the seals can be of square or rectangular cross-sectional configuration as shown in FIG. 1, with a compressible mass of pliant material.

The seal members 48 should be held in a suitable position around an upper portion of the fixed structure 26 such as the top of the silo wall, or extension thereof, or an upper edge or top flange of the silo liner 32. Apt securing means comprise brackets 50 such as L-shaped or angle iron units, a grooved surface, an adhesive, and the like.

Preferably the seal member 48 does not make physical contact with an overhead surface of the seismically isolated superstructure so as to provide for an annular vent 52 or space of up to about one inch between the fixed structure 26 and the superstructure 28 which is maintained during normal reactor operating conditions. Such a vent 52 avoids direct contact of the seal with the under side of the superstructure 28 whereby unrestricted relative movement between the seal 48 and the seismically isolated superstructure 28 during earthquake events is assured, and a path for the escape of hot combustion products during initial periods of a postulated double vessel 12 and 22 leak event is maintained thereby avoiding any significant pressure buildup in the reactor cavities.

A unique feature of sealing arrangement of this invention is that the seal 48 will close tightly when the steel silo liner tank 32 heats up to about 700 degrees F. following a double vessel leak when it is exposed to hot sodium and/or sodium fires. As the liner tank 32 heats up it will expand upward up to about two inches and thereby close the one inch or less gap comprising the vent between the fixed structure and the overhead super-structure which provides a tight seal after such an accident. The space 52 between the concrete silo wall 24 and the steel silo liner 32, or insulation 36 thereon, serves as a steam vent path for any steam driver out of the concrete silo following a double vessel leak accident. However, the silo liner tank thermal insulation 36 limits the concrete heatup to acceptable levels that will not result in substantial reductions in concrete structural integrity.

Figure 6:
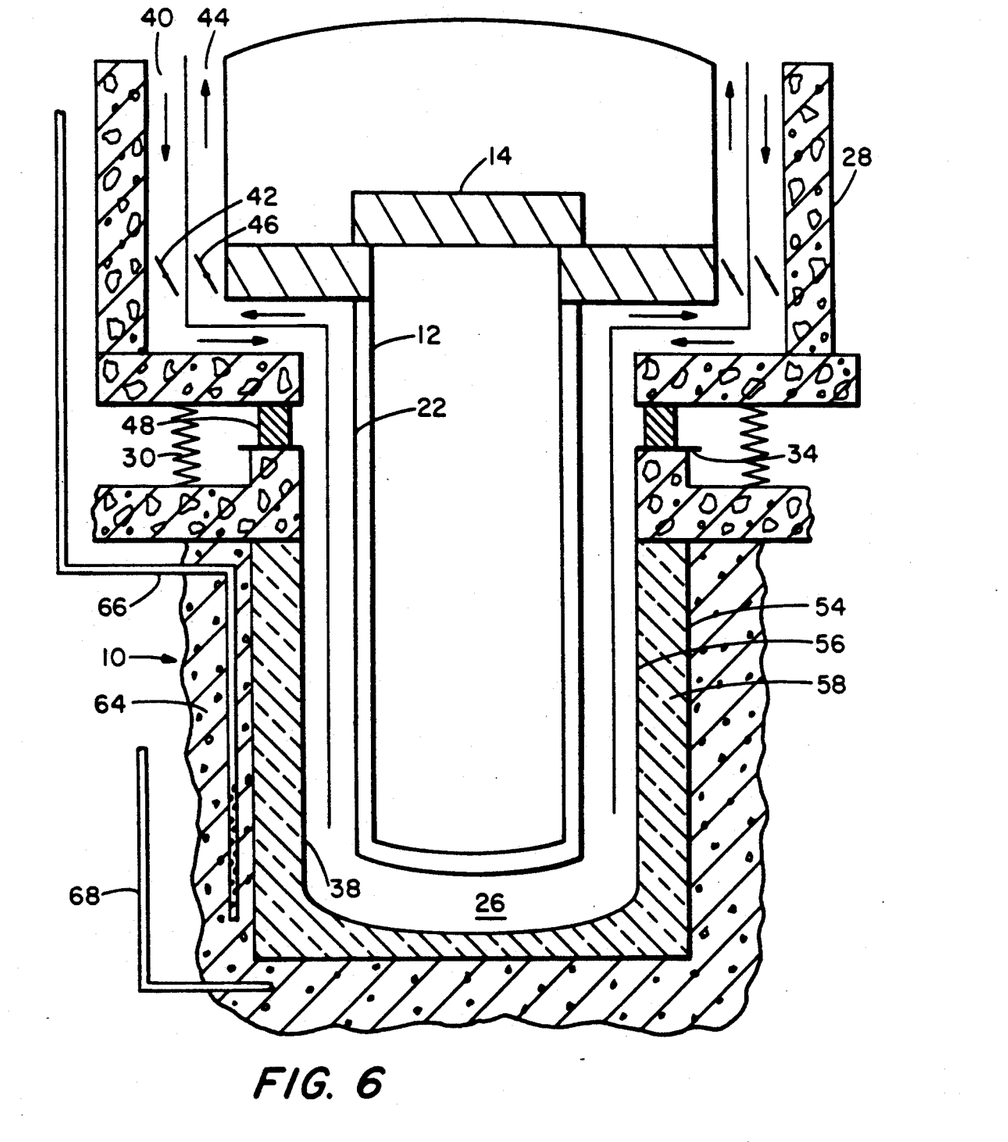
FIG. 6 is a schematic illustration of a liquid metal cooled nuclear reactor plant of this invention showing a variation in cross-section.
Figure 7:
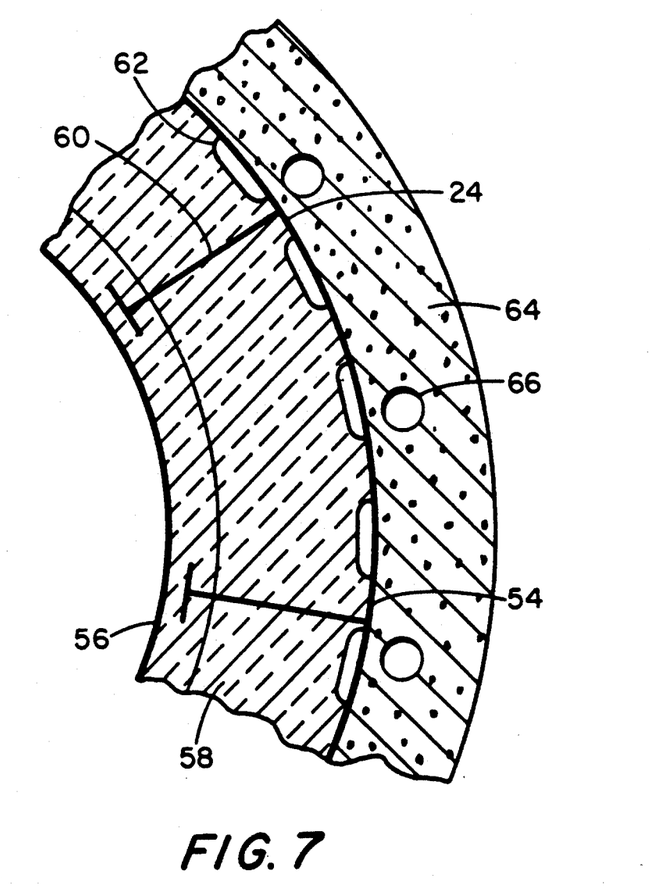
FIG. 7 is an exploded view illustrating a variation in detail of a portion of the structure of the embodiment shown in FIG. 6.

A modification of this invention is shown in FIG. 6 and 7 of the drawings illustrating a variation in the reactor silo cavity comprising the fixed structure which is secured by substantially embedding within the earth. In this modification the reactor silo 24 comprises structural steel which has several advantages in this application. For instance a steel silo 24 provides a backup heat removal system upon a loss of a passive air cooling system and the closing of valves 42 and 46 of the system since heat can more easily be conducted through the steel wall structure into the surrounding earth and ground water can provide or augment shutdown cooling following certain highly unlikely, postulated events as described above. Moreover, this structural steel silo modification can be enhanced by providing a backup ground water cooling system which is designed to mitigate the effects of a double vessel breach resulting in the blockage of auxiliary passive fluid heat exchanger circuits as described above.

Referring to FIGS. 6 and 7 of the drawing, the reactor silo 24, comprising an open top cylindrical tank with its longitudinal axis vertically aligned, is constructed of steel. The vertical steel silo is likewise secured substantially embedded within the earth with a majority of the steel tank below ground level whereby it provides a fixed structure. The steel silo structure 24 comprise an outer steel vessel 54 and an inner steel vessel 56 with a granular fill material 58 of high thermal conductivity, such as iron granules, occupying the space between the spaced apart outer and inner silo vessels 54 and 56. Preferably vertical steel beams 60 extend from the inside surface of the outer vessel 54 inward towards, but preferable not contacting the outer surface of the inner silo vessel 56. Preferably the vertical steel beams are arranged radially, are provided with a plurality of horizontal steel braces 62 or webs extending between the vertical steel beams 60 at several levels passing through the granular fill heat conducting material 50.

Preferably a barrier layer of coarse gravel 64 surrounds the outer steel vessel of the reactor silo structure to provide a surrounding body of porous material and exclude an influx of fine earth in order to allow an inflow of any ground water within the locations. This space comprising gravel 64 around and beneath the reactor silo provides a high permeability to water and steam flow.

Several perforated steam vent pipes 66 are provided passing upward from near the bottom of the reactor silo through the barrier layer of water permeable gravel supporting and surrounding the silo structure to above ground level whereby they discharge out into the atmosphere. Thus if the silo structure overheats due to a postulated accidental event such as the breach of the double vessels, the adjacent groundwater within the surrounding permeable gravel is evaporated to steam which is carried off through the vent pipes to the above ground atmosphere. This system is particularly effective as a heat exchanger in removing heat from the silo structure.

If the reactor site is relatively dry or a rock strata, water for this unique ground heat exchanger can be supplied from any available source to the permeable gravel around the silo structure by gravity through several pipes 68 extending down to an area adjacent the bottom of the silo structure.

This modification of the invention overcomes the problem of the incompatibility of a liquid metal coolant such as sodium with concrete containing hydraulic cement. Unlikely leaks of sodium into the silo structure will not create a hazard if the sodium reaches the structure formed of concrete. Moreover, a steel silo structure has good heat transfer properties and can effectively dissipate decay heat into the surrounding ground water for cooling by evaporation.

What is claimed is:

1. An improved liquid metal cooled nuclear reactor plant system, comprising the combination of:
    a fixed structure comprising an open top silo vessel;
    a seismically isolated structure comprising a reactor vessel containing a pool of liquid metal coolant with a core of heat producing fissionable fuel immersed therein and a containment vessel substantially surrounding the reactor vessel in spaced apart relation with the reactor vessel thereby providing an intermediate closed space between the reactor and containment vessels for retaining a gas;
    said reactor and containment vessels of the seismically isolated structure extending concentrically downward into the open top silo vessel fixed structure in spaced apart relation whereby the silo vessel substantially surrounds the reactor and containment vessels; and
    an annular flexible seal member positioned between an upper annular edge of the fixed structure and the seismically isolated structure.

2. The improved liquid metal cooled nuclear reactor plant system of claim 1, wherein the seismically isolated structure is mounted on seismic isolating shock absorbing units supported on the fixed structure.

3. The improved liquid metal cooled nuclear reactor plant system of claim 1, wherein the annular flexible seal member comprises a continuous compressible mass of pliant material.

4. The improved liquid metal cooled nuclear reactor plant system of claim 1, wherein the annular flexible seal member comprises an annulus of a hollow flexible tube containing gas which expands the seal when exposed to heat.

5. An improved liquid metal cooled nuclear reactor plant system, comprising the combination of:
    a fixed structure comprising an open top cylindrical silo vessel positioned axially vertical;
    a seismically isolated structure comprising a cylindrical reactor vessel containing a pool of liquid metal coolant with a core of heat producing fissionable fuel immersed therein and a cylindrical containment vessel substantially surrounding the reactor vessel in concentric spaced apart relation with the reactor vessel thereby providing an intermediate closed space between the reactor and containment vessels for retaining a protective gas;
    said seismically isolated structure being mounted on seismic isolating shock absorbing units supported in the fixed structure and spaced a short distance from the supporting fixed structure with the cylindrical reactor and containment vessels extending concentrically downward into the open top cylindrical silo vessel in spaced apart relation whereby the silo vessel substantially surrounds the reactor and containment vessels; and
    an annular flexible seal member positioned within the spaced between on upper annular edge of the fixed structure and the seismically isolated structure.

6. The improved liquid metal cooled nuclear reactor plant system of claim 5, wherein multiple annular flexible seal members are positioned within the space between an upper annular edge of the fixed structure and the seismically isolated structure.

7. The improved liquid metal cooled nuclear reactor plant system of claim 5, wherein the open top cylindrical silo vessel comprises an concrete wall and bottom.

8. The improved liquid metal cooled nuclear reactor plant system of claim 5, wherein the open top cylindrical silo vessel comprises an metal wall and bottom.

9. The improved liquid metal cooled nuclear reactor plant system of claim 5, wherein the annular flexible seal member comprises an annulus of a hollow flexible tube containing a gas which expands the seal when exposed to increased heat.

10. An improved liquid metal cooled nuclear reactor plant system, comprising the combination of:
    a fixed structure comprising a concrete open top cylindrical silo vessel positioned axially vertical;
    a seismically isolated structure comprising a cylindrical reactor vessel containing a pool of liquid metal coolant with a core of heat producing fissionable fuel immersed therein and a cylindrical containment vessel substantially surrounding the reactor vessel in concentric spaced apart relation with the reactor vessel thereby providing an intermediate closed space between the reactor and containment vessels for retaining a protective gas;
    said seismically isolated structure being mounted on multiple seismic isolating shock absorbing units supported in the fixed structure and thereby being maintained spaced apart a short distance from the supporting fixed structure and with the cylindrical reactor and containment vessels extending concentrically downward into the concrete open top cylindrical silo vessel in spaced apart relation whereby the silo vessel substantially surrounds the reactor and containment vessel; and
    at least one annular flexible seal member positioned within the space between an upper annular surface of the fixed structure and the seismically isolated structure, whereby upon overheating of the silo liner tank due to a mishap the inherent expansion of the overheated silo liner tank will tightly close the annular flexible seal member between the fixed structure and the seismically isolated structure.

11. The improved liquid metal cooled nuclear reactor plant system of claim 10, wherein the concrete open top cylindrical silo vessel is provided with a metal liner.

12. The improved liquid metal cooled nuclear reactor plant system of claim 10, wherein the concrete open top cylindrical silo vessel is provided with a metal liner having an adjoining layer of thermal insulation over its outer surface and in spaced apart relation to the inner surface of the concrete silo vessel.

13. The improved liquid metal cooled nuclear reactor plant system of claim 10, wherein the annular flexible seal member comprises a continuous compressible mass of pliant material.

14. The improved liquid metal cooled nuclear reactor plant system of claim 10, wherein the annular flexible seal member comprises an annulus of a hollow flexible tube containing a gas which expands the seal when exposed to heat.

15. An improved liquid metal cooled nuclear reactor plant system, comprising the combination of:

a fixed structure comprising a pair of concentrically arranged and spaced apart open top metal cylindrical silo vessels positioned axially vertical and having high thermal conductivity material therebetween;

a seismically isolated structure comprising a cylindrical reactor vessel containing a pool of liquid metal coolant with a core of heat producing fissionable fuel immersed therein and a cylindrical containment vessel substantially surrounding the reactor vessel in concentric spaced apart relation with the reactor vessel thereby providing an intermediate closed space between the reactor and containment vessels for retaining a protective gas;

said seismically isolated structure being mounted on multiple seismic isolating shock absorbing units supported in the fixed structure and thereby maintained spaced apart a small distance from the supporting fixed structure and with the cylindrical reactor and containment vessels extending concentrically downward into the pair of open top metal cylindrical silo vessels in spaced apart relation whereby the silo vessels substantially surrounds the reactor and containment vessels; and at least one annular flexible seal member positioned within the space between an upper annular surface of the fixed structure and the seismically isolated structure.

16. The improved liquid metal cooled nuclear reactor plant system of claim 15, wherein the annular flexible seal members comprises a continuous compressible mass of pliant material.

17. The improved liquid metal cooled nuclear reactor plant system of claim 15, wherein the annular flexible seal member comprises an annulus of a hollow flexible tube containing a gas which expands the seal when exposed to heat.

18. The improved liquid metal cooled nuclear reactor plant system of claim 15, wherein a plurality of vertical and horizontal metal beams extend generally radial substantially between the pair of concentrically arranged and spaced apart open top metal cylindrical silo vessels passing between sections of the high thermal conductivity material, whereby heat is carried away from the cylindrical silo vessel.

19. The improved liquid metal cooled nuclear reactor plant system of claim 15, wherein multiple annular flexible seal members are positioned within the space between the upper annular edge of the fixed structure and the seismically isolated structure.

* * * * *